US008377162B2

(12) United States Patent
Lee et al.

(10) Patent No.: US 8,377,162 B2
(45) Date of Patent: Feb. 19, 2013

(54) AIR CLEANER FOR VEHICLE

(75) Inventors: Sang Il Lee, Suwon-si (KR); Kwang-Hyun Pieh, Ansan-si (KR)

(73) Assignees: Hyundai Motor Company, Seoul (KR); Kia Motors Corporation, Seoul (KR); Inzicontrols Co., Ltd., Siheung-si (KR)

(*) Notice: Subject to any disclaimer, the term of this patent is extended or adjusted under 35 U.S.C. 154(b) by 150 days.

(21) Appl. No.: 12/957,198

(22) Filed: Nov. 30, 2010

(65) Prior Publication Data

US 2012/0073252 A1 Mar. 29, 2012

(30) Foreign Application Priority Data

Sep. 28, 2010 (KR) ........................ 10-2010-0093935

(51) Int. Cl.
*B01D 46/00* (2006.01)

(52) U.S. Cl. ............. 55/385.3; 55/493; 55/497; 55/502; 55/503; 55/495; 55/480; 123/198 E

(58) Field of Classification Search ................. 55/385.3, 55/502, 503, 493, 497, 506, 495; 123/198 E; 180/68.1, 69.2; 60/297, 311
See application file for complete search history.

(56) References Cited

U.S. PATENT DOCUMENTS

| | | | | |
|---|---|---|---|---|
| 5,640,937 | A * | 6/1997 | Slopsema | 123/198 E |
| 5,730,768 | A * | 3/1998 | Kaminaga et al. | 55/385.3 |
| 6,866,694 | B2 * | 3/2005 | Moreau et al. | 55/385.3 |
| 7,628,835 | B2 * | 12/2009 | Horiuchi | 55/385.3 |
| 2008/0110146 | A1 * | 5/2008 | Germain et al. | 55/385.3 |

FOREIGN PATENT DOCUMENTS

| | | | |
|---|---|---|---|
| JP | 2000-291500 | A | 10/2000 |
| KR | 10-0341917 | B1 | 6/2002 |
| KR | 10-0391135 | B1 | 7/2003 |
| KR | 10-0514222 | B1 | 9/2005 |
| KR | 10-0941243 | B1 | 2/2010 |

* cited by examiner

*Primary Examiner* — Duane Smith
*Assistant Examiner* — Minh-Chau Pham
(74) *Attorney, Agent, or Firm* — Morgan, Lewis & Bockius LLP

(57) ABSTRACT

An air cleaner for a vehicle includes a body accommodating a filter element, a cover that covers the top of the body, and clamping units clamping the body and the cover. The clamping units include i) at least one first clamp that clamps sides of the body and the cover by means of elastic force of a first spring and functions as a hinge point allowing the cover to rotate with respect to the body and ii) at least one second clamp that clamps the other sides of the body and the cover by means of elastic force of a second spring and locks and unlocks the body and the cover by means of rotation of a key.

5 Claims, 8 Drawing Sheets

AIR CLEANER FOR VEHICLE

CROSS-REFERENCE TO RELATED APPLICATION

This application claims priority to and the benefit of Korean Patent Application No. 10-2010-0093935 filed in the Korean Intellectual Property Office on Sep. 28, 2010, the entire contents of which application is incorporated herein for all purposes by this reference.

BACKGROUND OF THE INVENTION

1. Field of the Invention

The present invention relates to an air cleaner for a vehicle, and more particularly, to an air cleaner which may be made of plastic for a vehicle.

2. Description of the Related Art

In general, the intake system of vehicle engines is equipped with an air cleaner that sucks air from the atmosphere, filters foreign substances from the air, and then supplies the filtered air to the engine.

The air cleaner includes a body accommodating a filter element etc., a cover that covert the upper portion of the body, and a plurality of clamping units that clamps the cover to the body, using elasticity of springs.

In common gasoline vehicles, the air cleaner is made of plastic and mounted apart from the injector, such that explosion pressure is not directly transmitted to the air cleaner; therefore, the body and the cover are fixed by the clamping units.

On the other hand, in vehicles using LPG fuel, since a mixer that mixes the LGP fuel with the air is mounted between the intake hose and a throttle body, combustion in the engine reaches even around the mixer, such that the explosion pressure (hereafter, referred to as "backfire pressure) is transmitted to the inside of the air cleaner.

Therefore, when the LPG vehicle is equipped with the air cleaner made of plastic and having the structure with the body and the cover fixed by clamping units, the backfire pressure is exerted as large internal pressure between the body and the cover; therefore, the parts of the air cleaner (body, cover, filter element, and clamping units, etc.) are damaged by the backfire pressure.

Accordingly, the air cleaners made of plastic are replaced by air cleaners made of steel in the LPG vehicles in the related art, but in this case, the weight and manufacturing cost of the air cleaners are increased.

The information disclosed in this Background section is only for enhancement of understanding of the general background of the invention and should not be taken as an acknowledgement or any form of suggestion that this information forms the prior art already known to a person skilled in the art.

SUMMARY OF THE INVENTION

Various aspects of the present invention have been made in an effort to provide for an air cleaner for a vehicle having advantages of being able to be made of plastic and prevent damage from backfire pressure by removing the backfire pressure with a simple structure.

One aspect of the present invention provides for an air cleaner that is made of plastic and includes a body accommodating a filter element, a cover that covers the top of the body, and clamping units clamping the body and the cover, in which the clamping unit includes a clamp that clamps the edges of the body and the cover by means of elastic force of a spring and locks and unlocks the body and the cover by rotation of a key.

Another aspect of the present invention provides for an air cleaner that is made of plastic and includes a body accommodating a filter element, a cover that covers the top of the body, and clamping units clamping the body and the cover, in which the clamping units include a clamp that clamps the edges of the body and the cover by means of elastic force of a spring and functions as a hinge point allowing the cover to rotate with respect to the body.

Yet another aspect of the present invention provides for an air cleaner for a vehicle that is made of plastic and includes a body accommodating a filter element, a cover that covers the top of the body, and clamping units clamping the body and the cover, in which the clamping units include i) at least one first clamp that clamps sides of the body and the cover by means of elastic force of a first spring and functions as a hinge point allowing the cover to rotate with respect to the body and ii) at least one second clamp that clamps the other sides of the body and the cover by means of elastic force of a second spring and locks and unlocks the body and the cover by means of rotation of a key.

Further, in the air cleaner for a vehicle, a gap may be defined between the body and the cover, against the elastic force of the first and second springs by the internal pressure between the body and the cover.

Further, in the air cleaner for a vehicle, the first and second clamps may be made of plastic.

Further, in the air cleaner for a vehicle, the first clamp may be mounted in a first mounting portion formed at one edge of the body.

Further, in the air cleaner for a vehicle, a hinge protrusion hinged to the first clamp may be formed at one edge of the cover.

Further, in the air cleaner for a vehicle, the hinge protrusion may be formed in a yoke shape with the bottom inclined with respect to the top and may have a hinge groove where the first clamp is fitted.

Further, in the air cleaner for a vehicle, the second clamp may be mounted in a second mounting portion formed at the other edge of the body.

Further, in the air cleaner for a vehicle, a locking protrusion locked to the second mounting portion by the second clamp may be formed at the other edge of the cover.

Further, in the air cleaner for a vehicle, the locking protrusion may protrude outward from the edge of the cover and may have a locking groove where the second clamp is fitted.

Further, in the air cleaner for a vehicle, the first clamp may include a first shaft mounted in the first mounting portion to be movable up/down and fitted in the hinge groove of the hinge protrusion, a first locking portion integrally formed at the top of the first shaft and locked to the top of the hinge protrusion, a first cap mounted in the first mounting portion and where the lower end of the first shaft is fitted, and a first cap bolt fitted in the lower end of the first shaft, with the first spring fitted on the first shaft in the first cap.

Further, in the air cleaner for a vehicle, the first locking portion may have a first surface that is flat to support the top of the hinge protrusion and a second surface rounded upward and connected to the first surface.

Further, in the air cleaner for a vehicle, wherein the first shaft may have a guide protrusion integrally connected with the first locking portion and vertically fitted in a guide groove of the first mounting portion.

Further, in the air cleaner for a vehicle, the second clamp may include a second shaft mounted in the second mounting portion to be movable up/down and rotatable and fitted in a locking groove of the locking protrusion, a second locking portion integrally formed at the top of the second shaft and locked to the locking protrusion by means of rotation of the second shaft, a second cap mounted in the second mounting portion and where the lower end of the second shaft is fitted, and a second cap bolt fitted in the lower end of the second shaft, with the second spring fitted on the second shaft in the second.

Further, in the air cleaner for a vehicle, a grip for holding may be integrally formed at the second locking portion.

According to various aspects of the present invention, since a configuration which is made of plastic and can remove the backfire pressure is achieved, the air cleaner can be used for vehicles using gasoline and it is possible to reduce the weight and manufacturing cost and prevent damage from the backfire pressure.

Further, since the first clamp functions as a hinge point allowing the cover to rotate with respect to the body in various aspects, the air cleaner may be used in a small space that is not enough to attach/detach the cover to/from the body.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION

Figure 1:
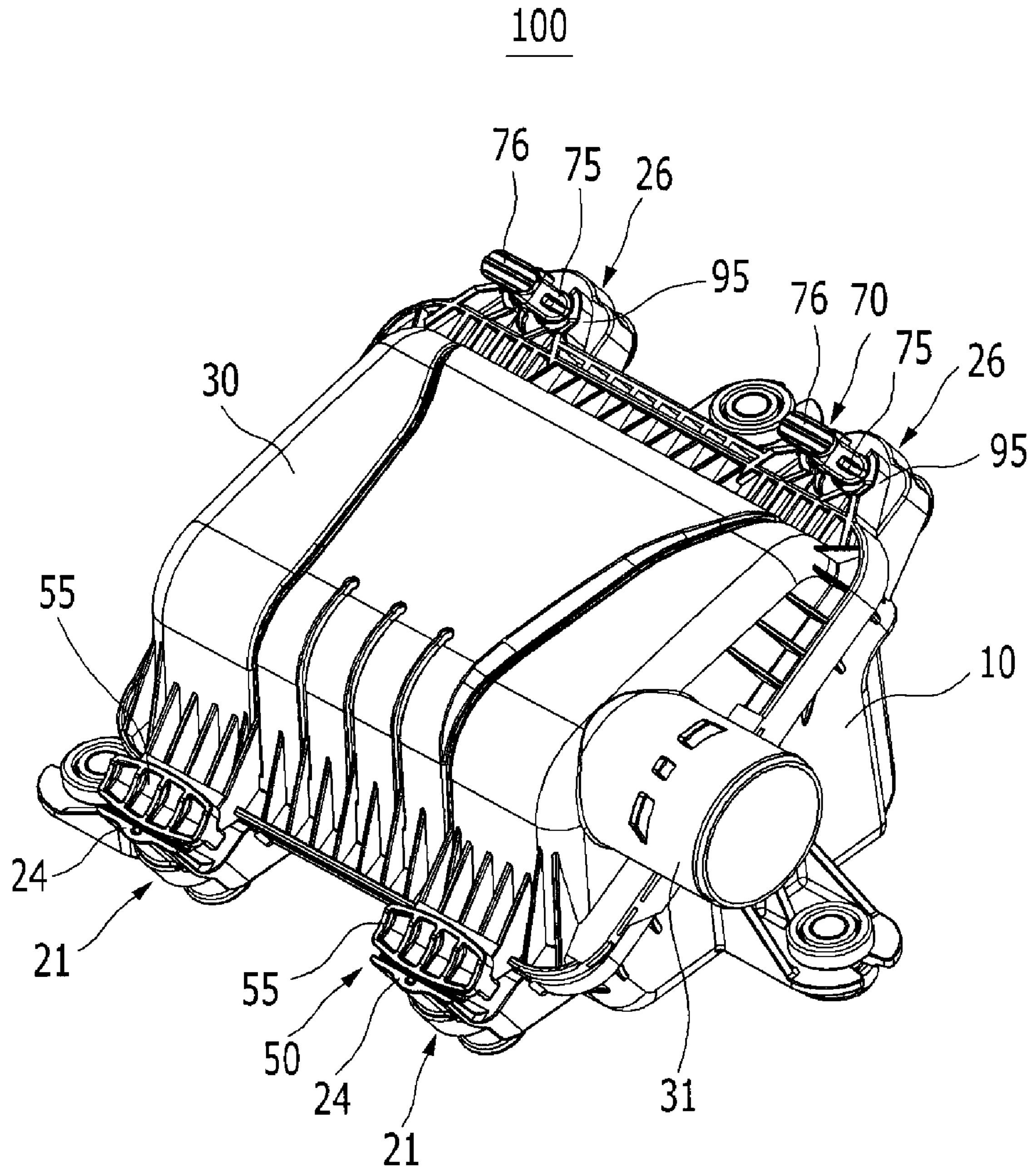
FIG. 1 is a perspective view showing an exemplary air cleaner for a vehicle according to the present invention.
Figure 2:
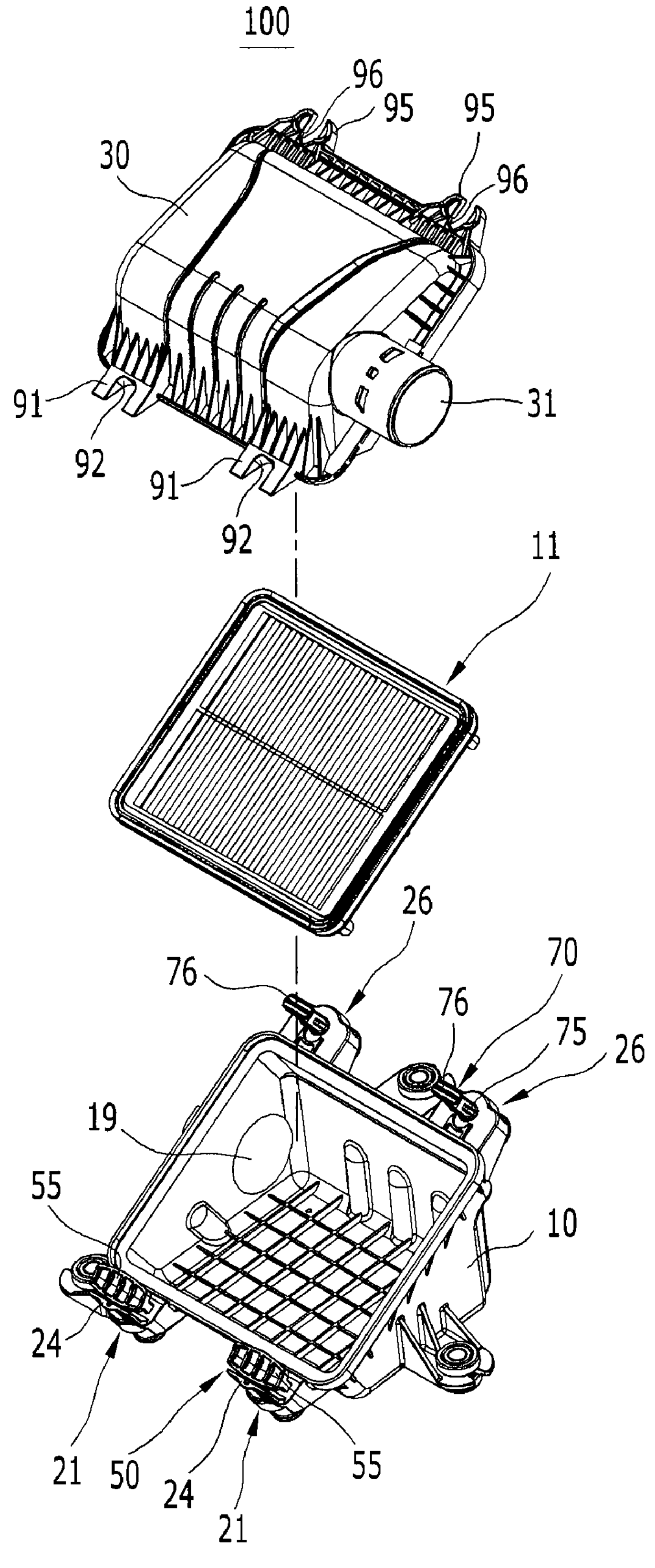
FIG. 2 is an exploded perspective view of FIG. 1.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The drawings and description are to be regarded as illustrative in nature and not restrictive. Like reference numerals designate like elements throughout the specification.

Further, the size and thickness of each component shown in the drawings are arbitrarily shown for understanding and ease of description, but the present invention is not limited thereto, and the thickness of parts, regions, etc., are exaggerated for clarity.

Referring to the figures, an air cleaner 100 for a vehicle according to various embodiments of the present invention can be used for LPG vehicles that use Liquefied Petroleum Gas (hereafter, referred to as "LPG") as fuel.

The air cleaner 100 for an LPG vehicle according to various embodiments may be disposed in the intake system of the LPG engine including a mixer (not shown) that mixes the air with the LPG.

The intake system of the LPG engine is implemented by common intake systems for LPG engines well known in the art and the detailed description is not provided.

The air cleaner 100 for a vehicle is provided to suck air from the atmosphere, filter the foreign substances from the air, and then supply the filtered air to the mixer.

Since the mixer is mounted between the intake hose and the throttle body in the intake system of the LPG engine, the combustion in the engine reaches around the mixer, such that the explosion pressure (hereafter, referred to as "backfire pressure") may be transmitted to the inside of the air cleaner 100 according to various embodiments.

Therefore, the air cleaner 100 for a vehicle according to various embodiments may be made of plastic and has a structure that is not damaged by the backfire pressure.

For this purpose, the air cleaner 100 for a vehicle according to various embodiments of the present invention basically includes a body 10, a cover 30, and clamping units 50 and 70, which are described below.

The body 10 is made of plastic and has a space therein to accommodate a filter element 11 that filters the air, in various embodiments.

Further, the body 10 has an air outlet 19 to discharge the air filtered by the filter element 11 to the engine.

In this configuration, the filter element 11 is supported by a filter frame fixed between the top of the body 10 and the bottom of the cover 30 and it is an intake filter well known in the art, and accordingly, the detailed description is not provided in the specification.

The body 10 is a rectangular case with the top open, where the opening is inclined upward from one side to the other side. The lower edge of the opening may be defined as one edge while the upper edge may be defined in the other edge in various embodiments.

In various embodiments, the cover 30 is made of plastic with the bottom open, corresponding to the body 10, to cover the opening of the body 10, and may be connected to the edges of the opening of the body 10 by the clamping units 50 and 70, which are describe below in detail.

In this case, the cover 30 has an air inlet 31 to suck the external air into the filter element 11 in the body 10.

The clamping units 50 and 70 are provided to clamp the cover 30 to the body 10, with the opening of the body 10 covered by the cover 30.

The clamping units 50 and 70 may include a first clamp 50 made of plastic to clamp one edge of the body 10 and one edge of the cover 30 which corresponds to the edge of the body 10 and a second clamp 70 made of plastic to clamp the other edge of the body 10 and the other edge of the cover 30 which corresponds to the other edge of the body.

In various embodiments, the first clamp 50 clamps edges of the body 10 and the cover 30, using elastic force of a spring, is a hinge clamp allowing the cover 30 to rotate with respect to the body 10, and may be mounted in a pair on one edge of the body 10.

That is, the first clamp 50 makes a hinge point that allows the cover 30 to rotate about one edge of the body 10.

The first clamp 50 is mounted at one edge of the body 10, and for this configuration, a first mounting portion 21 is formed at one edge of the body 10 to mount the first clamp 50.

Figure 3:
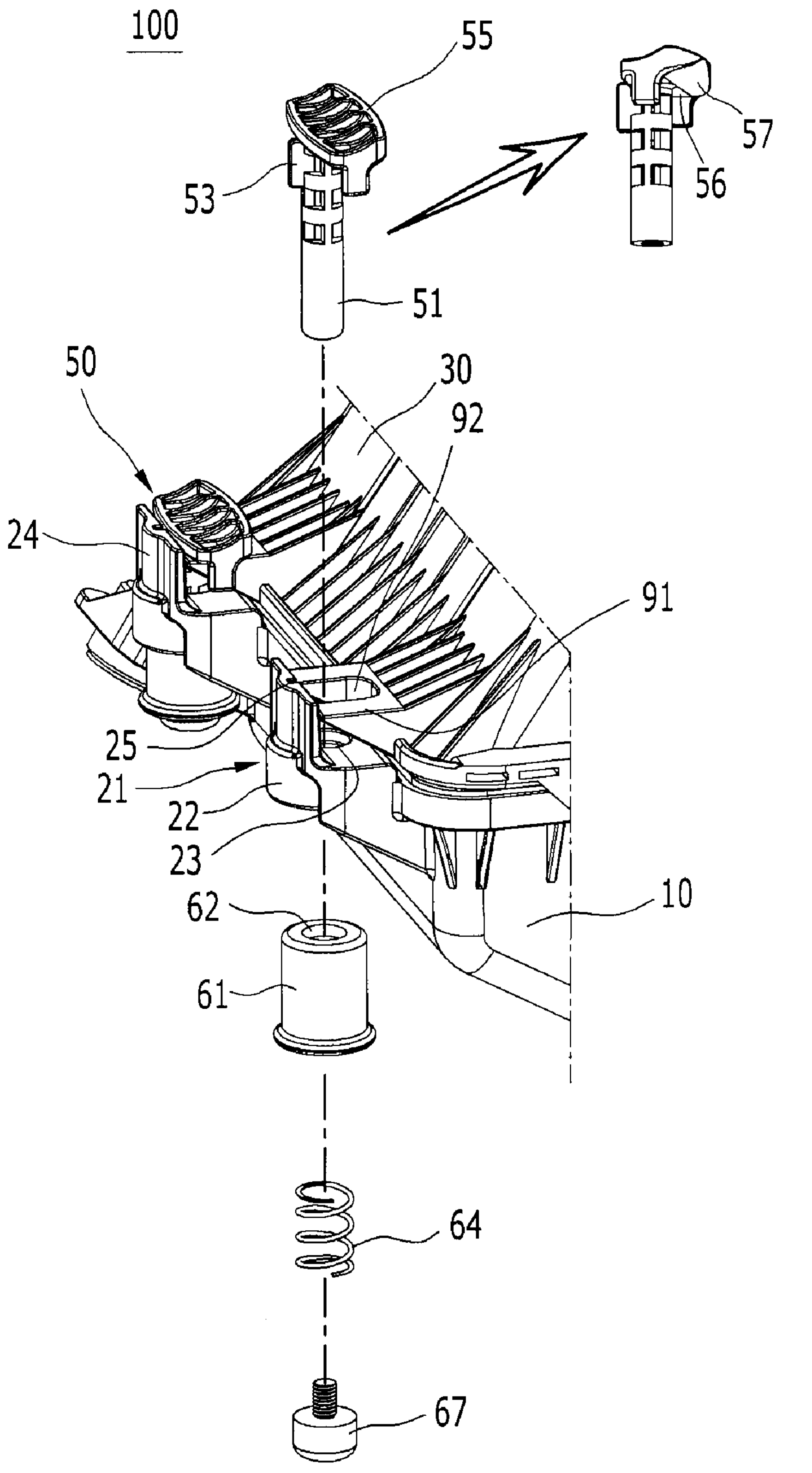
FIG. 3 is a partial exploded perspective view showing the combination structure of an exemplary first clamp used in the air cleaner for a vehicle according to the present invention.
Figure 4:
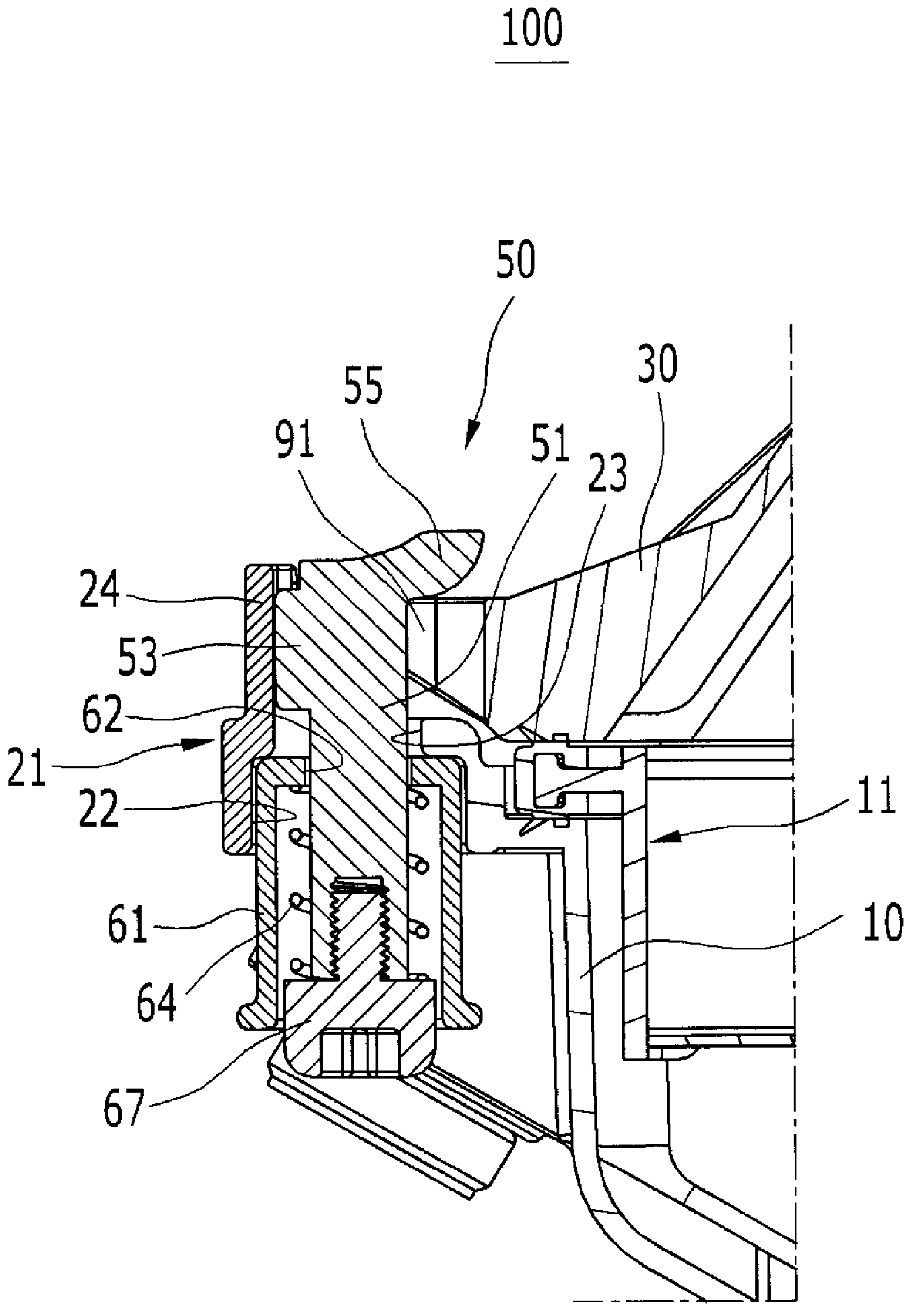
FIG. 4 is a cross-sectional view showing an assembly of the parts shown in FIG. 3.

Hereafter, the structure of the first clamp 50 described above and a structure for mounting the first clamp 50 to the first mounting portion 21 are described in detail with reference to FIGS. 3 and 4.

The first mounting portion 21 protrudes from one edge of the body 10 and has a cylindrical first mounting groove 22 with the bottom open to assemble the first clamp 50 and a first mounting hole 23 connected to the first mounting groove 22 on the top.

Further, a support protrusion 24 supporting a first shaft 51 of the first clamp 50, which is described in detail below, is formed on the top of the first mounting portion 21, and has a guide groove 25 formed upward.

In various embodiments, the first clamp 50 includes the first shaft 51, a first locking portion 55, a first cap 61, a first spring 64, and a first cap bolt 67.

The first shaft 51 has a circular external circumference and is mounted in the first mounting portion 21 to be able to move up/down, that is, may be fitted in the first mounting hole 23 of the first mounting portion 21 to be able to move up/down and disposed on the first mounting groove 22.

The first locking portion 55 is integrally formed at the top of the first shaft 51 in a rectangular shape having predetermined width and length, and has a first surface 56 that is flat and a second surface 57 rounded upward and connected to the first surface 56, on the bottom. One will appreciate that the first locking portion may be monolithically formed at the top of the first shaft.

In this configuration, the first shaft 512 has a guide protrusion 53 that is integrally connected with the first locking portion 55 and vertically fitted in the guide groove 25 of the support protrusion 24 of the first mounting portion 21. One will appreciate that the guide protrusion may be monolithically formed with the first locking portion.

The first cap 61 is mounted in the first mounting groove 22 of the first mounting portion 21 to be locked to the upper surface in the mounting groove 22, and is formed in a cylindrical shape with the bottom open.

In this case, a first fitting hole 62 where the first shaft 51 is fitted through the first mounting hole 23 is formed on the top of the first cap 61.

The first spring 64, which is fitted on the first shaft 51 in the first cap 61, is a compression coil spring that is compressed by the first shaft 51 while applying elastic force against first shaft 51

Further, the first cap bolt 67 may be thread-fastened to the lower end of the shaft 51, with the first spring 64 fitted on the first shaft 51 in the first cap 61. The first cap bolt 67 has an external diameter larger than the external diameter of the first shaft 51.

Therefore, the upper end of the first spring 64 is supported by the upper surface in the first cap 61 and the lower end is supported by the first cap bolt 67.

In various embodiments, the second clamp 70 clamps the other edges of the body 10 and the cover 30, using the elastic force of a spring, and is a key clamp that can lock/unlock the body 10 and the cover 30 by key rotation.

The second clamp 70 is mounted in a pair at the other edge of the body 10, and for this configuration, a second mounting portion 26 for mounting the second clamp 70 is formed at the other edge of the body 10.

Figure 5:
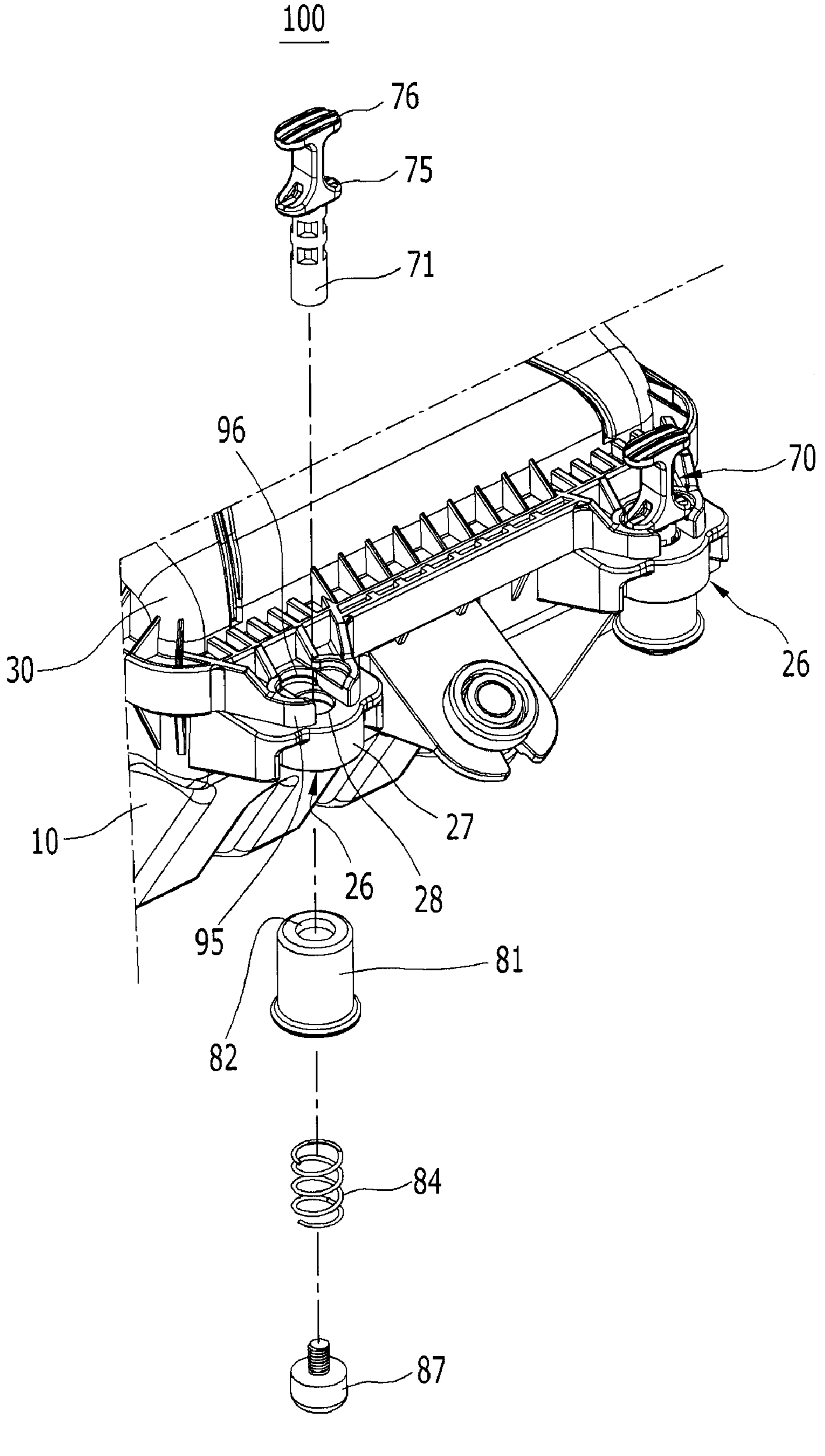
FIG. 5 is a partial exploded perspective view showing the combination structure of an exemplary second clamp used in the air cleaner for a vehicle according to the present invention.
Figure 6:
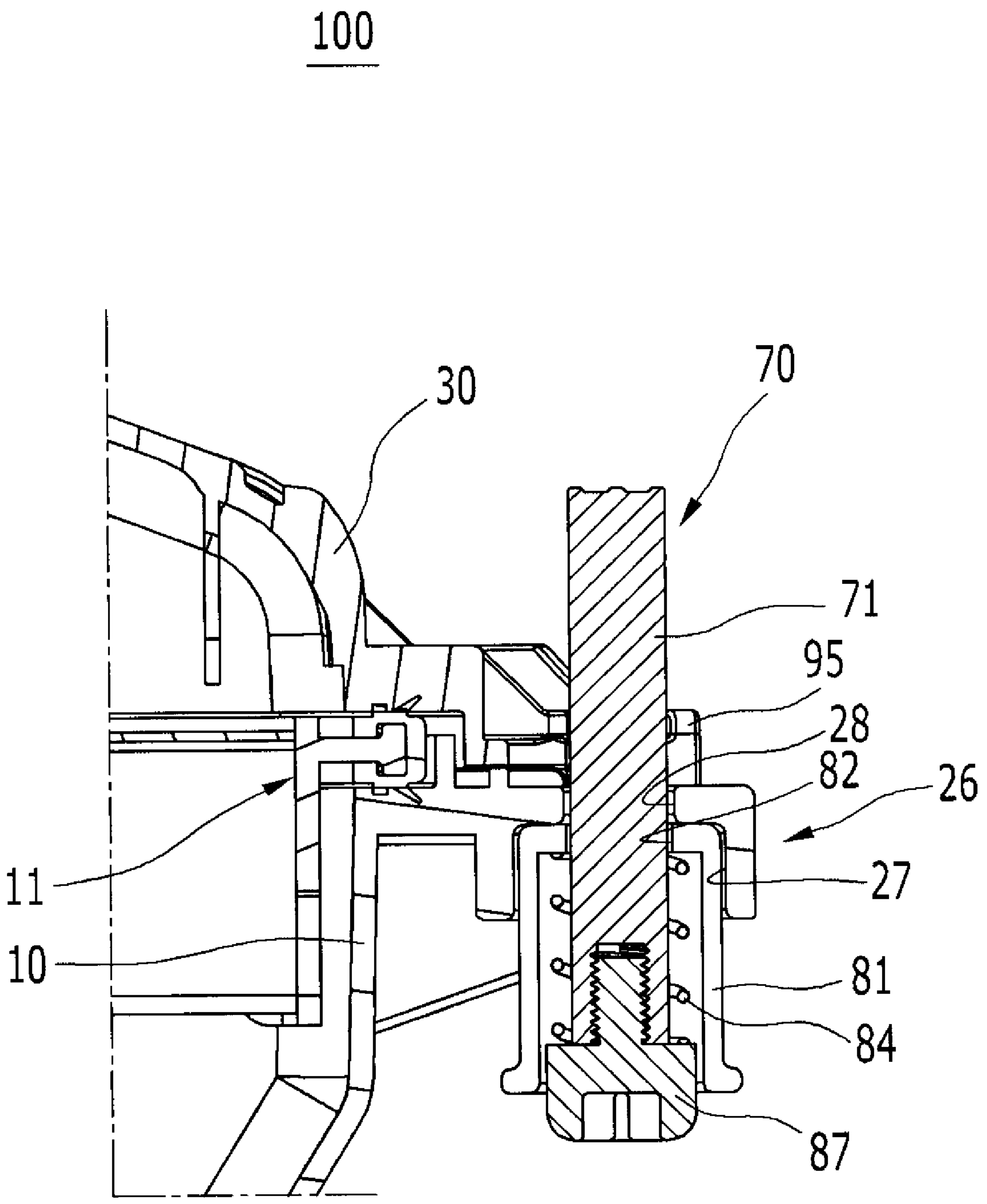
FIG. 6 is a cross-sectional view showing an assembly of the parts shown in FIG. 5.

Hereafter, the structure of the second clamp 70 and the structure for mounting the second clamp 70 in the second mounting portion 26 are described in detail with reference to FIGS. 5 and 6.

The second mounting portion 26 protrudes from the other edge of the body 10 and has a cylindrical second mounting groove 27 with the bottom open to assemble the second clamp 70 and a second mounting hole 28 connected to the second mounting groove 27 on the top.

In various embodiments, the second clamp 70 includes a second shaft 71, a second locking portion 75, a second cap 81, a second spring 84, and a second cap bolt 87.

The second shaft 71 has a circular external circumference and is mounted in the second mounting portion 26 to be able to move up/down and rotate, that is, may be fitted in the second mounting hole 28 of the second mounting portion 26 and disposed on the second mounting groove 27.

The second locking portion 75 is integrally formed at the top of the second shaft 71 and may be locked to the edge of the cover 30, which is described below, by rotation of the second shaft 71. One will appreciate that the second locking portion may be monolithically formed with the top of the second shaft.

In this case, a grip 76 that a worker or a user holds is integrally formed at the second locking portion 75. One will appreciate that the grip may be monolithically formed with the second locking portion.

The second cap 81 is mounted in the second mounting groove 27 of the second mounting portion 26 to be locked to the upper surface in the mounting groove 27, and is formed in a cylindrical shape with the bottom open.

In this case, a second fitting hole 82 where the second shaft 71 is fitted through the second mounting hole 28 is formed on the top of the second cap 81.

The second spring 84, which is fitted on the second shaft 71 in the second cap 81, is a compression coil spring that is compressed by the second shaft 71 while applying elastic force against second shaft 71.

Further, the second cap bolt 87 may be thread-fastened to the lower end of the shaft 71, with the second spring 84 fitted on the second shaft 71 in the second cap 81. The second cap bolt 87 has an external diameter larger than the external diameter of the second shaft 71.

Therefore, the upper end of the second spring 84 is supported by the upper surface in the second cap 81 and the lower end is supported by the second cap bolt 87.

Meanwhile, in various embodiments, a hinge protrusion 91 hinged to the first clamp 50 may be formed at one edge of the cover 30 which corresponds to the first mounting portion 21 of the body 10 and a locking protrusion 95 locked to the second mounting portion 26 by the second clamp 70 may be formed at the other edge of the cover 30 which corresponds to the second mounting portion 26 of the body 10.

The hinge protrusion 91 protrudes from one edge of the cover 30 in a yoke shape with the bottom inclined with respect to the top, and has a hinge groove 92 where the first shaft 51 of the first clamp 50 is fitted.

In this configuration, the hinge protrusion 91 is guided by the second surface 57 of the first locking portion 55 of the first clamp 50 and the first shaft 51 is fitted in the hinge groove 92, when the cover 30 is combined with the body 10, in which it lifts up the first shaft 51 and its top is supported by the first surface 56 and locked to the first locking portion 55, with the first spring 64 compressed.

Further, the locking protrusion 95 protrudes outward from the edge of the cover 30 and a locking groove 96 where the second shaft 71 of the second clamp 70 is fitted is formed in the protrusion direction.

In this configuration, the locking protrusion 95 may allows the second locking portion 75 of the second clamp 70 to pass through the locking groove 96 and may be locked to the second locking portion 75 by rotation of the second shaft 71, when the cover 30 is combined with the body 10.

In a process of assembling the air cleaner 100 for a vehicle having the configuration described above, according to various embodiments of the present invention, the first clamp 50 is first mounted in the first mounting portion 21 of the body 10 and the second clamp 70 is mounted in the second mounting portion 26, in various embodiments.

In this position, the cover 30 is combined with the body 10, in which the second locking portion 75 of the second clamp 70 is fitted in the locking groove 96 of the locking protrusion 95 of the cover 30, and then the cover 30 is pressed.

Accordingly, the hinge protrusion 91 of the cover 30 is guided by the second surface 57 of the first locking portion 55 of the first clamp 50 and the first shaft 51 is fitted in the hinge groove 92, in which it lifts up the first shaft 51 and its top is supported by the first surface 56 and locked to the first locking portion 55, with the first spring 64 compressed.

Thereafter, in various embodiments, a user holds the grip 76 of the second clamp 70 and lifts up and turns the second shaft 71 in one direction. Accordingly, in various embodiments, the second locking portion 75 is locked to the locking protrusion 95, with the second spring 84 compressed by the second shaft 71.

Therefore, the first and second clamps 50 and 70 can clamp the body 10 and the cover 30 by means of the elastic force of the first and second springs 64 and 84, in the process described above.

Figure 7A:
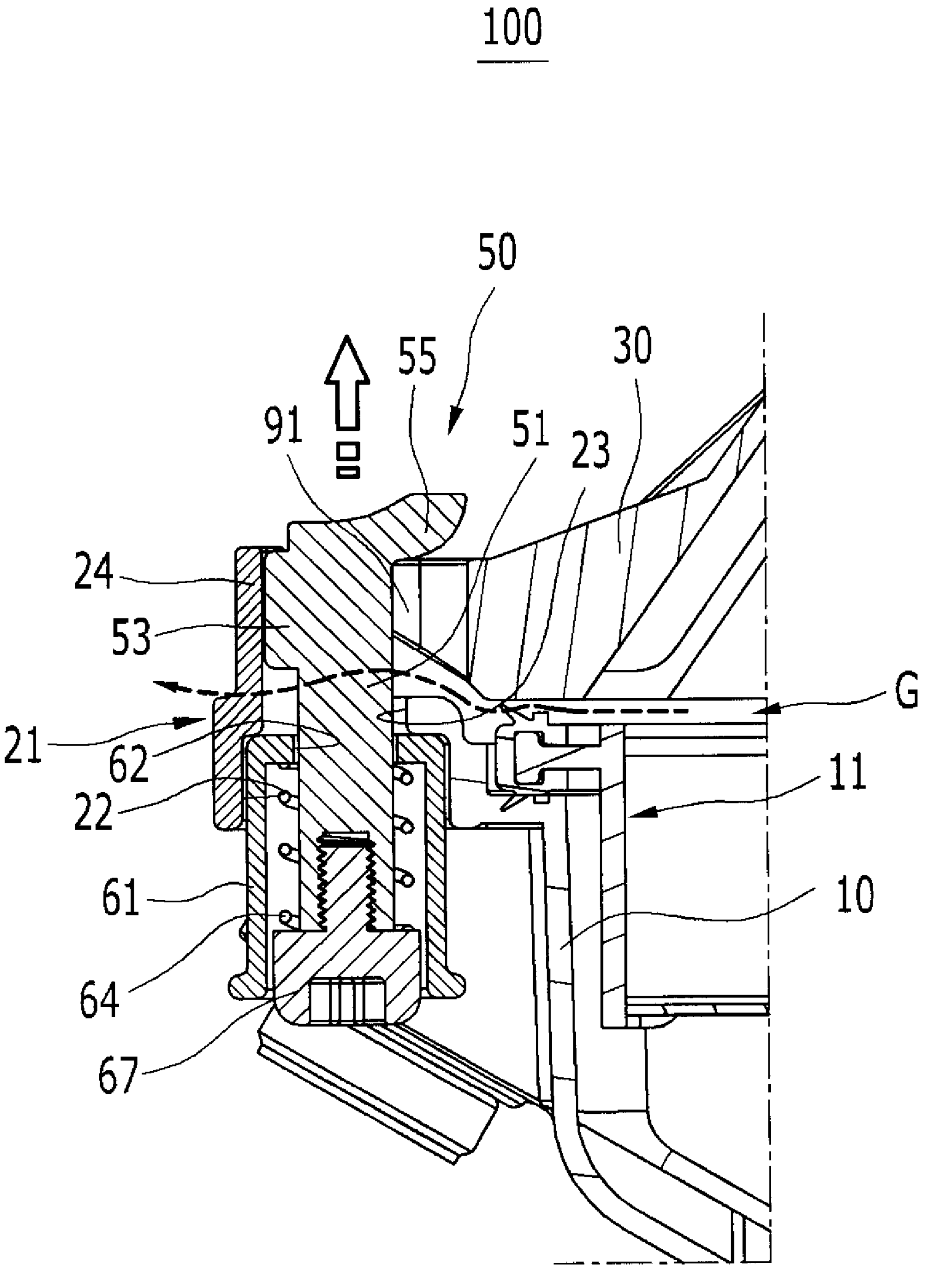
FIG. 7A and FIG. 7B are views illustrating the operation of an exemplary air cleaner for a vehicle according to the present invention.
Figure 7B:
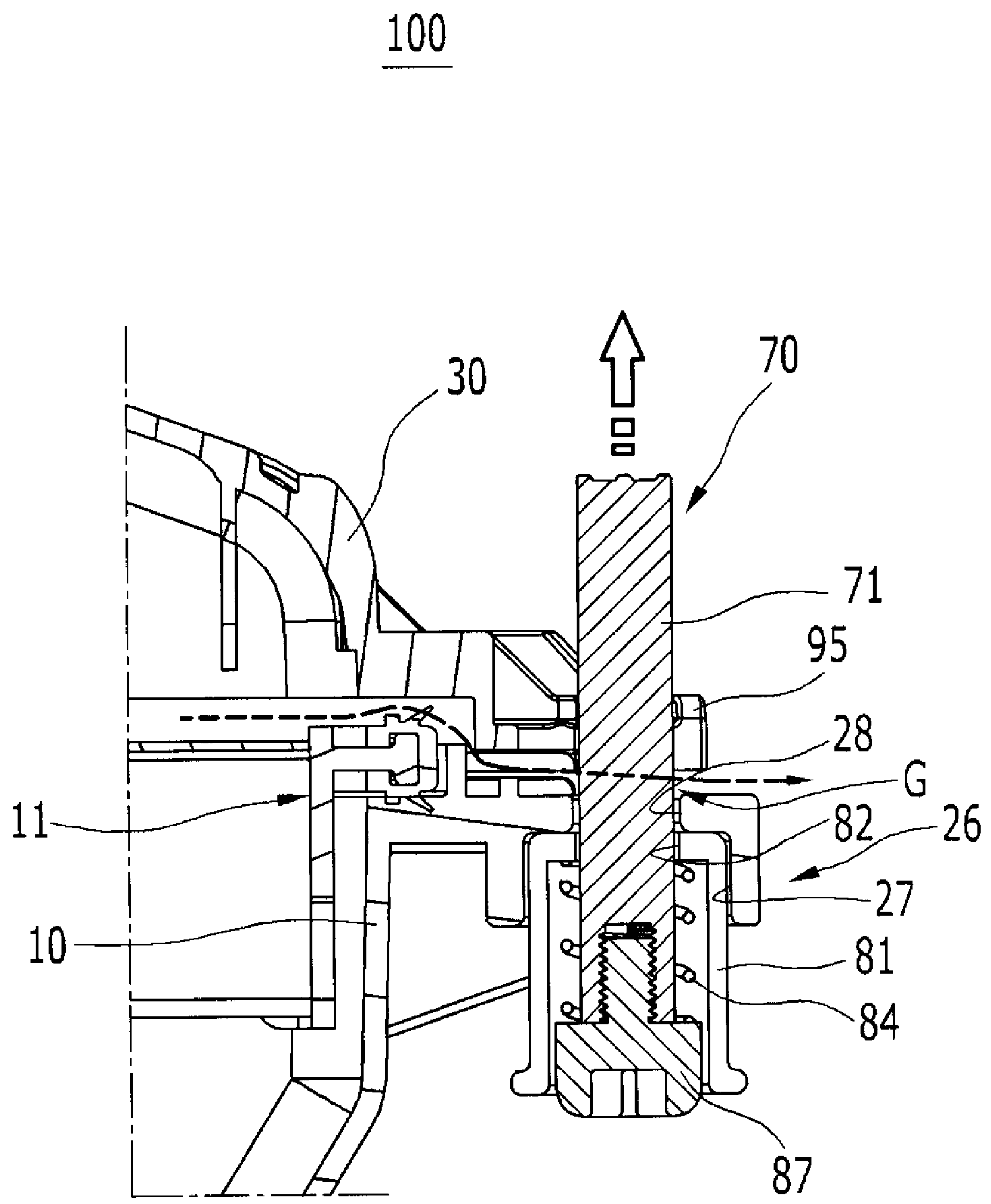

Accordingly, in various embodiments, when backfire pressure above a predetermined level is exerted between the body 10 and the cover 30, as shown in FIGS. 7A and 7B, the cover 30 is lifted up by the backfire pressure against the elastic force of the first and second springs 64 and 84, such that a gap G is defined between the body 10 and the cover 30.

Therefore, the backfire pressure is released through the gap G between the body 10 and the cover 30, and when the backfire pressure drops below predetermined pressure, the cover 30 is recombined with the body 10 by the elastic force of the first and second springs 64 and 84.

Meanwhile, in various embodiments, the user holds the grip 76 of the second clamp 70 and lifts up and turns the second shaft 71 in one direction in order to replace the filter element 11 in the body 10 in the state described above.

Accordingly, in various embodiments, the second locking portion 75 is unlocked from the locking protrusion 95 and the edges of the body 10 and the cover 30 are separated, such that the cover 30 is rotated about the clamp 50 and the inside of the body 10 is opened.

That is, since the first locking portion 55 of the first clamp 50 presses the top of the hinge protrusion 91 of the cover 30 by means of the elastic force of the first spring 64, the cover 30 can rotate with the top of the hinge protrusion 91 supported by the first locking portion 55, when the second clamp 70 is unlocked.

According to the air cleaner 100 for a vehicle according to various embodiments of the present invention described above, since the first and second clamps 50 and 70 which are made of plastic and can remove the backfire pressure, the air cleaner can be used for vehicles using gasoline and it is possible to reduce the weight and manufacturing cost and prevent damage from the backfire pressure.

Further, since the first clamp 50 functions as a hinge point that allows the cover 30 to rotate with respect to the body 10 in various embodiments, the air cleaner can be used in a small space that is not enough to attach/detach the cover 30 to/from the body 10.

Although various embodiments exemplifies when edges of the body 10 and the cover 30 are clamped by the hinge-typed first clamp 50 and the other edges of the body 10 and the cover 30 are clamped by the key-typed second clamp 70, the present invention is not limited thereto and the entire edges of the body 10 and the cover 30 may be clamped by the first clamp 50 or the second clamp 70.

For convenience in explanation and accurate definition in the appended claims, the terms "upper" or "lower", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. An air cleaner for a vehicle comprising:

a body accommodating a filter element;

a cover that covers the top of the body; and clamping units clamping the body and the cover; and wherein the clamping units include:

at least one first clamp that clamps sides of the body and the cover by means of elastic force of a first spring and functions as a hinge point allowing the cover to rotate with respect to the body; and at least one second clamp that clamps the other sides of the body and the cover by means of elastic force of a second spring and locks and unlocks the body and the cover by means of rotation of a key;

wherein a gap is defined between the body and the cover, against the elastic force of the first and second springs by the internal pressure between the body and the cover;

wherein the first and second clamps are made of plastic;

wherein the first clamp is mounted in a first mounting portion formed at one edge of the body;

wherein a hinge protrusion hinged to the first clamp is formed at one edge of the cover;

wherein the hinge protrusion is formed in a yoke shape with the bottom inclined with respect to the top and has a hinge groove where the first clamp is fitted;

wherein the first clamp includes:

a first shaft mounted in the first mounting portion to be movable up/down and fitted in the hinge groove of the hinge protrusion;

a first locking portion monolithically formed at the top of the first shaft and locked to the top of the hinge protrusion;

a first cap mounted in the first mounting portion and where the lower end of the first shaft is fitted; and a first cap bolt fitted in the lower end of the first shaft, with the first spring fitted on the first shaft in the first cap;

wherein the first locking portion has a first surface that is flat to support the top of the hinge protrusion and a second surface rounded upward and connected to the first surface; and wherein the first shaft has a guide protrusion protruding along a longitudinal direction of the first shaft and integrally connected with the first locking portion and slidably fitted in a guide groove formed in a support protrusion of the first mounting portion.

2. The air cleaner of claim 1, wherein:

the second clamp is mounted in a second mounting portion formed at the other edge of the body; and a locking protrusion locked to the second mounting portion by the second clamp is formed at the other edge of the cover.

3. The air cleaner for a vehicle of claim 2, wherein:

the locking protrusion protrudes outward from the edge of the cover and has a locking groove where the second clamp is fitted.

4. The air cleaner of claim 3, wherein the second clamp includes:

a second shaft mounted in the second mounting portion to be movable up/down and rotatable and fitted in a locking groove of the locking protrusion;

a second locking portion monolithically formed at the top of the second shaft and locked to the locking protrusion by means of rotation of the second shaft;

a second cap mounted in the second mounting portion and where the lower end of the second shaft is fitted; and a second cap bolt fitted in the lower end of the second shaft, with the second spring fitted on the second shaft in the second cap.

5. The air cleaner of claim 4, wherein:

a grip for holding is monolithically formed at the second locking portion.

* * * * *